United States Patent
Iyer et al.

(10) Patent No.: US 11,347,615 B2
(45) Date of Patent: May 31, 2022

(54) SYSTEM AND METHOD FOR CONTEXT-BASED PERFORMANCE OPTIMIZATION OF AN INFORMATION HANDLING SYSTEM

(71) Applicant: DELL PRODUCTS, LP, Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 16/932,210

(22) Filed: Jul. 17, 2020

(65) Prior Publication Data
US 2022/0019509 A1 Jan. 20, 2022

(51) Int. Cl.
G06F 11/34 (2006.01)
(52) U.S. Cl.
CPC ...... *G06F 11/3414* (2013.01); *G06F 11/3438* (2013.01); *G06F 11/3476* (2013.01)
(58) Field of Classification Search
CPC ............. G06F 11/3414; G06F 11/3438; G06F 11/3476; G01D 18/00
USPC ....................................................... 702/186
See application file for complete search history.

(56) References Cited

U.S. PATENT DOCUMENTS

| | | | |
|---|---|---|---|
| 10,339,462 B2 | 7/2019 | Kelly | |
| 2014/0200036 A1 | 7/2014 | Egner et al. | |
| 2017/0109356 A1 | 4/2017 | Sawai et al. | |
| 2018/0314617 A1 | 11/2018 | Khosrowpour et al. | |
| 2018/0335968 A1* | 11/2018 | Pauley | G06F 11/3034 |
| 2019/0132406 A1* | 5/2019 | Cai | H04M 1/72454 |
| 2020/0034429 A1 | 1/2020 | Shukla et al. | |
| 2020/0134394 A1 | 4/2020 | Teshome et al. | |
| 2021/0294656 A1* | 9/2021 | Tomic | G06F 11/3006 |

* cited by examiner

*Primary Examiner* — Michael P Nghiem
(74) *Attorney, Agent, or Firm* — Larson Newman, LLP

(57) ABSTRACT

An information handling system includes a storage device configured to store contextual inputs obtained from components associated with the information handling system. A processor obtains telemetry data from one or more of the components, the telemetry data including contextual inputs according to a user context and a system context. The processor determines a recommendation that includes first applications to be preloaded, and second applications which status is to be changed based on the contextual inputs according to the user context. The recommendation further includes one or more system settings to be adjusted based on the contextual inputs according to the system context. The processor determines a first ordered list of the first applications to be preloaded according to a first priority and a second ordered list of the second applications which status is to be changed according to a second priority based on the recommendation.

20 Claims, 4 Drawing Sheets

SYSTEM AND METHOD FOR CONTEXT-BASED PERFORMANCE OPTIMIZATION OF AN INFORMATION HANDLING SYSTEM

FIELD OF THE DISCLOSURE

The present disclosure generally relates to information handling systems, and more particularly relates to context-based performance optimization of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a storage device configured to store contextual inputs obtained from components associated with the information handling system. A processor obtains telemetry data from one or more of the components, the telemetry data including contextual inputs according to a user context and a system context. The processor determines a recommendation that includes first applications to be preloaded, and second applications whose status is to be changed based on the contextual inputs according to the user context. The recommendation further includes one or more system settings to be adjusted based on the contextual inputs according to the system context. The processor determine a first ordered list of the first applications to be preloaded according to a first priority and a second ordered list of the second applications whose status is to be changed according to a second priority based on the recommendation, and preloads the first applications based on the first ordered list. The processor changes the status of one the second applications based on the second ordered list according to the second priority, and adjusts the one or more system settings on the information handling system based on the recommendation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
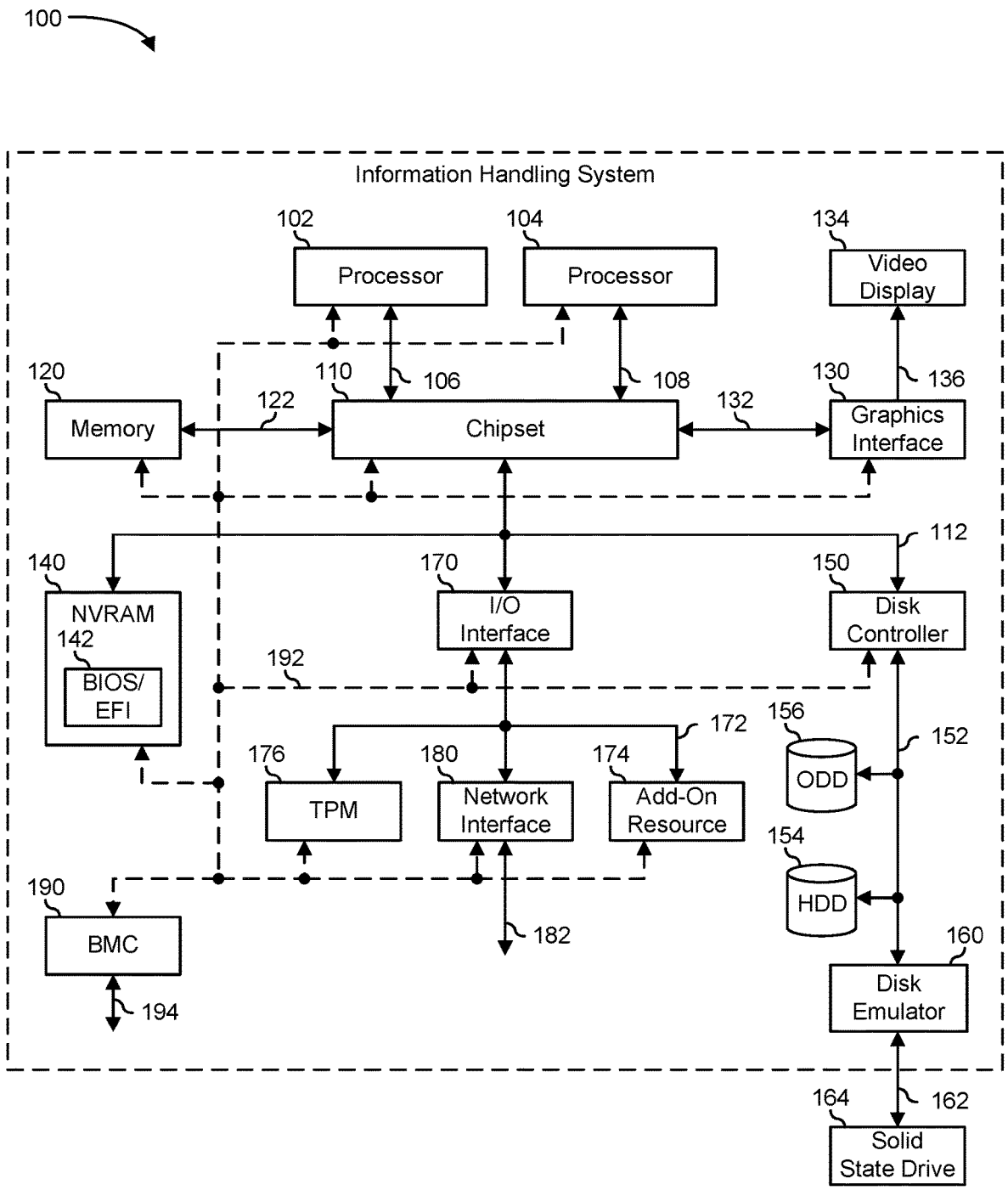
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

When users switch from one task with one set of applications to another task with another set of applications, responsiveness of various applications may suffer. Management of resources to optimize performance and increase responsiveness is desirable to provide a better user experience. The management of resources includes using predictive analytics that make users more productive by anticipating the user's intent and adjust accordingly.

Figure 2:
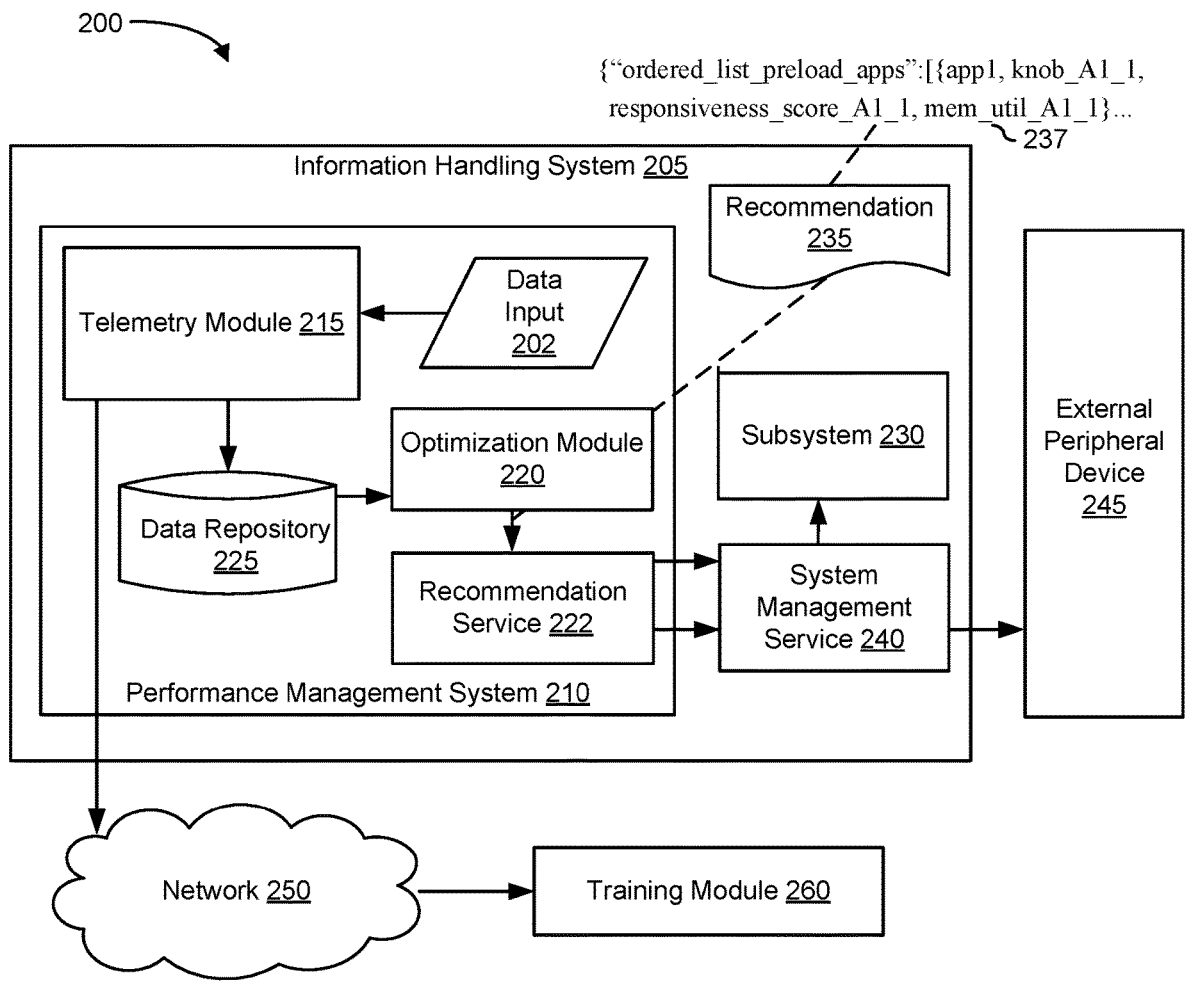
FIG. 2 is a block diagram illustrating an example of a system for context-based performance optimization of an information handling system, according to an embodiment of the present disclosure.

FIG. 2 illustrates a system 200 for context-based performance optimization of an information handling system. System 200 includes information handling system 205, an external peripheral device 245, a network 250, and a training module 260. Information handling system 205 which is similar to information handling system 100 of FIG. 1 includes a performance management system 210, a subsystem 230, and a system management service 240. Performance management system 210 includes a telemetry module 215, an optimization service 220, a recommendation service 222, and a data repository 225.

Performance management system 210 may be configured to predict or infer a user's intent and to optimize the performance of the information handling system 205 based on the prediction or inference. Accordingly, performance management system 210 may be configured to monitor the performance of information handling system 205 which includes periodically collecting information associated with a user's activity. In addition, performance management system 210 may monitor information handling system 205 to detect an upcoming or a transition to a particular user activity. In response to the detection of the upcoming or the transition to the particular user activity, performance management system 210 may initiate the collection of data from one or more components of information handling system 205. Performance management system 210 may determine which applications are currently in the foreground or background and/or the application to be put in the foreground or background based on the particular user's activity. In addition, performance management system 210 may also determine the changes in the collected information. Performance management system 210 may collect information to create a user profile to be used in learning and predicting the user's need so that the system can adapt and be responsive to the user. Based on the collected information and/or the determined changes, performance management system 210 may learn the applications and its configuration settings in addition to system settings for the particular user activity.

In one embodiment, some or all of the data collected may be transmitted to a training module similar to training module 260, where the data collected may be analyzed using various mechanisms such as a machine learning algorithm. The training module 260 may generate a training model that may be used by the software service to generate the recommendations. Although training module 260 is shown as remote to information handling system 205, training module 260 may be in-premise or local to information handling system 205.

Based on recommendation 235, performance management system 210 may determine the applications to be preloaded, which may be used by the user for the particular activity. The applications, such as a Universal Windows™ Platform (UWP) application, a Win32 application, a Win64 application, etc., may be preloaded according to a priority which may be based on the responsiveness of the application. For example, performance management system 210 may determine a set of applications that a user typically uses for the particular activity, such as a virtual office meeting. This set of applications may be combined with other applications that are running on information handling system 205 prior to the particular activity. Performance management system 210 may determine adjustments to the configuration settings of the combination of applications and/or system settings to optimize performance. The aforementioned determinations may be according to the user context and/or the system context.

In terms of the user context, performance management system 210 may determine the priority of one or more applications and/or processes, including the priority in closing one or more of the applications that are running. Based on the priority, performance management system 210 may determine which of the applications to preload using some form of caching mechanism. Performance management system 210 may also utilize knobs to adjust configuration settings of the applications to be preloaded. For example, one set of configuration settings may be adjusted based on the user context while another set of configuration settings may be adjusted based on the system context. Each user context may include one or more application context, that includes configuration settings and/or system settings associated with each application. Each user context and/or application context may be associated with a responsiveness time limit also referred to as a responsiveness time budget, wherein the preloading the applications may adhere to.

For example, performance management system 210 may learn that when having a virtual meeting, the user utilizes several applications such as Microsoft Teams™, One-Note™ and PowerPoint™. In addition, for a particular virtual meeting, the user accesses a PowerPoint file from OneDrive™ 80% of the time. The PowerPoint file usually takes approximately 20 seconds to load. Performance management system 210 may reduce the time to load the PowerPoint file to approximately five seconds or a 75% improvement in responsiveness as perceived by the user. This may be accomplished by downloading the PowerPoint file to a local hard drive prior to the virtual meeting. In addition, performance management system 210 may preload the PowerPoint application and make adjustments to PowerPoint's configuration settings and system settings such as to direct the PowerPoint application to load the PowerPoint file from the local hard drive.

The ability of performance management system 210 to optimize performance of information handling system 205 when detecting a transition from one user activity to another user activity is desirable. For example, a user may transition from a period of productivity to a period of collaboration, and then to a period of performing lighter tasks. Performance management system 210 may predict which applications would not be utilized and close those applications or put them in the background according to a priority. When a user is switching from a first activity to a second activity, the applications associated with the second activity may be preloaded and ready for the user within the responsiveness time limit. In addition, the applications associated with the first activity may be closed or moved to the background from the foreground. For example, when the user switches from managing his email to having a virtual meeting with his colleagues, performance management system 210 may determine the applications that may be relevant to the virtual meeting, such as a telecommunication application, a presentation application, and a document processor application.

Based on the determination, performance management system 210 may further determine whether one or more of the applications may be preloaded based on its priority. The priority may be based on various factors such as the relevance of the application to the virtual meeting and the application's responsiveness. For example, because performance management 210 has learned that the telecommunication application may be more relevant to the virtual meeting based on its 100% utilization rate on previous virtual meeting instances, performance management system 210 may determine that the telecommunication application is more relevant to the virtual meeting than the presentation application which has a 90% utilization rate and the word processing application which has a 75% utilization rate. Accordingly, the presentation application may have a higher priority than the word processing application.

In another example, the priority may be based on responsiveness, such as even if the presentation application has a higher priority than the document processor application based on its relevance if the presentation application has a lower responsiveness score than the document processor, performance management system 210 may determine to preload the document processor before it preloads the presentation application. In addition, performance management system 210 may determine applications associated with the user email to be closed or placed in the background so as not to interfere with the performance of information handling system 205 or its compute cycles.

After the virtual meeting, the user may switch to a third activity such as writing software code. In this example, performance management system 210 may have learned that the user switches to writing software code 90% of the time after the virtual meeting instead of back to managing his email which occurs at 50% of the time. Accordingly, performance management system 210 may determine the applications associated with the third activity and which of these applications to preload for the user. In addition, performance management system 210 may determine which applications to be closed or put in the background.

In terms of the system context, performance management system 210 may determine system configuration and optimization settings associated with each of the user activities such as power management and hints associated with the responsiveness of the framework such as via a system management service 240 which may be an Intel® Dynamic Platform and Thermal Framework (DPTF) service. Accordingly, performance management system 210 may initiate procedures to optimize the system configuration and optimization settings associated with each of the user activities.

Based on the above determinations, performance management system 210 may be configured to generate and apply rules to one or more components of information handling system 205 including applications therein. Performance management system 210 may use the rules to apply the determinations such as the preloading of a set of applications, closure of another set of applications, and system configuration and optimization setting adjustments to optimize the performance of information handling system 205 and provide favorable user experience by decreasing the latency of applications associated with the user's activity.

Telemetry module 215, which is a software service, may be configured to collect or receive data input 202 and transmit the data input 202 to training module 260 via network 250. Data input 202 may be stored in data repository 225 prior to transmission. Telemetry module 215 may also be configured to select one or more data points from data input 202 to be transmitted to training module 260. The transmitted data may be included as part of a training data set to be used by training module 260 in generating a training model. Training module 260 may be configured to apply various techniques such as machine learning to process the received data.

Data input 202 may include contextual data from telemetry data that was collected from various sources associated with information handling system 205. Contextual data includes one or more categories of data inputs such as a system inputs category, a user inputs category, and an environmental inputs category. The system inputs category may include platform/sensor data such as eye/facial tracking data, input/output data location data, voice/gesture data, biometrics data, biometrics data, audio data, peripherals, battery data. User inputs categories include inputs from one or more applications and the operating system such as foreground/background applications, services/processes data, time of day, calendar/schedule data, and system settings. The environmental inputs category includes ambient sound data, ambient lighting data, weather data, and events data.

Data repository 225 may be configured as a data lake, a data warehouse, or similar for storage of data input 202. Data input 202 may be stored in various formats such as its natural or raw format or a structured or semi-structured format. Data input 202 may also be transformed prior to storage. The transformed data may be used for machine learning, analytics, and/or reporting. In addition, data repository 225 may also store information associated with performance management system 210 and training module 260 such as a training model, recommendations, time limits, responsiveness time budgets, statistics, etc. While data repository 225 is shown as a local repository, data repository 225 may be located remotely such as "in the cloud."

Optimization service 220, which is a software service, may be configured to generate a recommendation in real-time such as recommendation 235. Optimization service 220 may be configured to determine one or more applications associated with an upcoming user activity as learned during the training. The applications may include browser tabs, Universal Windows Platform (UWP) application, Windows 32-bit/Windows 64-bit applications, etc. which may then be prioritized for preload by responsiveness scores. Also, optimization service 220 may determine applications whose status may be changed such as moved to the background or shut down. The applications to be changed may also be ordered according to a priority.

Below is a portion of a recommendation in a JavaScript Object Notation (JSON) schema format:
{"ordered_list_preload_apps":[{app1, knob_A1_1, responsiveness_score_A1_1, mem_util_A1_1}, {app1, knob_A1_2, responsiveness_score_A1_2, mem_util_A1_2}, {app2, knob_A2_1, responsiveness_score_A2_1, mem_util_A2_1}, ... {appN, knobs_AN_K, responsiveness_score_AN_K, mem_util_AN_K}]}
{"ordered_list_of_apps_to_change":[{app_1, new_process_ priority_1, close_or_not_1}, ... {app_M, new_process_ priority_M, close_or_not_M}]}

Recommendation 235 may be transmitted to recommendation service 222 which is an operating system service. Although, text 237 included in recommendation 235 is shown in a JSON data format, the text 237 in recommendation 235 may be in other data formats such as Extensible Markup Language (XML) data format, common data representation (CDR) data format, etc. Recommendation 235 includes an ordered list of applications to be preloaded and an ordered list of applications whose status is to be changed. Recommendation 235 may also include an ordered list of system settings to be adjusted. The list of the applications to be preloaded may be based according to a priority, wherein the application to be preloaded first may be in the ordered list first. Each application, in the ordered lists of applications to be preloaded, includes an application identifier, a configuration knob, and information associated with the knob such as its responsiveness score and memory utilization. The configuration knob, also referred herein simply as a knob, maybe a software control mechanism associated with an application that may be used to tune or adjust a configuration setting of the application. Performance management system 210 may monitor the effect of the adjustment and perform an additional adjustment if desirable.

Each of the knobs may have latency when responding to an adjustment. Hence, each knob may have a responsiveness score which refers to the speed on how the knob affects the performance of the application. In one embodiment, the higher the responsiveness score the more responsive is the knob. Memory utilization refers to the amount of memory that may be used when adjusting the configuration setting associated with the knob. As shown, the application with application identifier "app1" may be associated with two knobs, "knob_A1_1" and "knob_A1_2". The knobs may be ordered or prioritized according to responsiveness and/or memory utilization. Thus, "knob_A1_1" may be more responsive than "knob_A1_2". If "knob_A1_1" and "knob_A1_2" have the same or similar responsiveness score, then the order of the knobs may be based further according to memory utilization, wherein the knob with less memory utilization may have a higher priority than the knob with more memory utilization. The list of ordered applications whose status is to be changed may include a priority and a flag that indicates whether to close the application or not. If the flag is set to true, then the application may be closed. If the flag is set to false, then the application may be kept running.

Recommendation service 222 may perform various calculations such as a combinatorial optimization based on recommendation 235. Recommendation service 222 may also calculate statistics according to the user context and/or the system context, such as responsiveness time budget based on responsiveness score and memory utilization. Based on the calculations, may recommendation service 222 may determine how to efficiently utilize resources of information handling system 205 for the user activity. Accordingly, recommendation service 222 may follow or deviate from recommendation 235.

Recommendation service 222 may be configured to generate or determine a set of rules that may be used to preload the applications and/or change the status of the application based on its calculations. Using the rules, recommendation service 222 may tweak one or more knobs to make adjustments to the application's configuration settings. The adjustments may be performed before or during the application's preload or change of status. In one embodiment, recommendation service 222 may perform the adjustments according to the ordered list in recommendation 235.

Changing the status of an application may refer to putting the application in the foreground or the background. For example, recommendation service 222 may preload a media player application when a user downloads a music file. Also, recommendation service 222 may be configured to correlate the applications associated with the user context with settings associated with the system context. Recommendation service 330 may also manipulate or adjust the system settings of components of information handling system 205. For example, recommendation service 222 may adjust a system setting associated with subsystem 230 and/or external peripheral device 245 via system management service 240. Subsystem 230 includes a memory subsystem, a processing subsystem, a power subsystem, a network subsystem, a display subsystem, etc. External peripheral device 245 includes an external display, a microphone, etc. System management service 240 may be configured to adjust system settings in the BIOS, drivers, and operating system of information handling system 205 to maximize the performance of information handling system 205 during a particular user activity. The system settings may include GPU settings, power settings, process priority, number of CPU cores, etc.

Network 250 may be implemented as or maybe a part of, a storage area network (SAN), a personal area network (PAN), a local area network (LAN), a metropolitan area network (MAN), a wide area network (WAN), a wireless LAN (WLAN), a virtual private network (VPN), an intranet, the Internet, or any other appropriate architecture or system that facilitates the communication of signals, data and/or messages. Network 250 may transmit data using any storage and/or communication protocol, including without limitation, Fibre Channel, Frame Relay, Asynchronous Transfer Mode (ATM), Internet Protocol (IP), other packet-based protocol, SCSI, Internet SCSI (iSCSI), Serial Attached SCSI (SAS), or any other transport that operates with the SCSI protocol, ATA, serial ATA (SATA), ATA packet interface (ATAPI), serial storage architecture (SSA), integrated drive electronics (IDE), and/or any combination thereof. Network 250 and its various components may be implemented using hardware, software, or any combination thereof.

Figure 3:
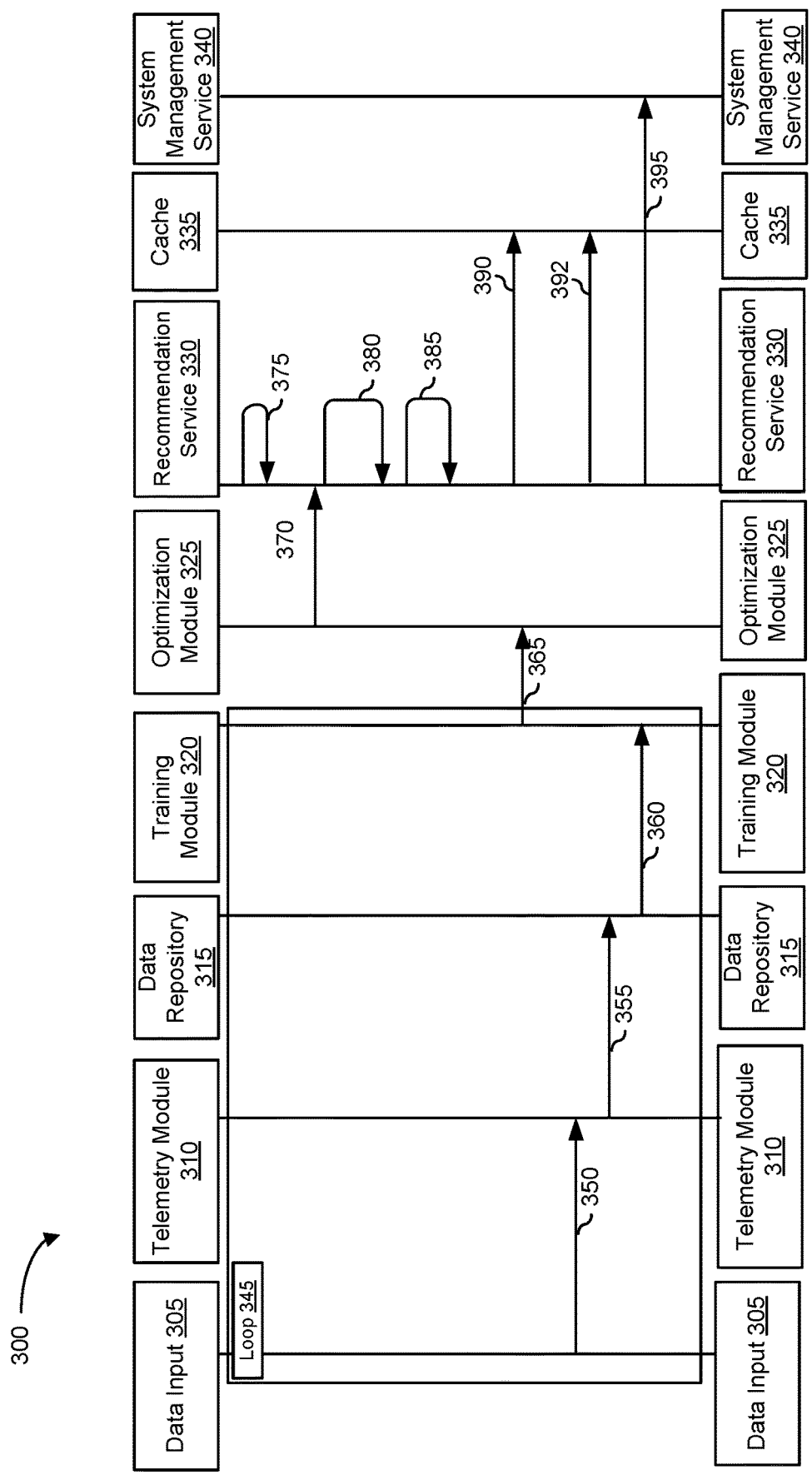
FIG. 3 is a block diagram illustrating an example of a data flow for context-based performance optimization of an information handling system, according to an embodiment of the present disclosure.

FIG. 3 shows a flow diagram 300 FIG. 3 is a block diagram illustrating an example of a data flow for context-based performance optimization of an information handling system. Flow diagram 300 includes data input 305, a telemetry module 310, a data repository 315, a training module 320, an optimization service 325, a recommendation service 330, a cache 335, and a system management service 340.

Telemetry module 310, which is similar to telemetry module 215 of FIG. 2, may be configured to receive or collect information from multiple data sources and ingests the collected information into data repository 315. The ingestion may be performed in real-time or periodically in batches. The information received or collected such as data input 305 includes telemetry data from one or more components of information handling system 205. Data input 305 may include any operational information associated with information handling system 205 or a user profile. For example, data input 305 may include attributes associated with performance, environmental conditions, or system operational information. As an example, data associated with a hard disk drive may include information regarding cyclic redundancy check errors, the volume of reading input/output, volume of write input/output, operating temperature, rotation rate of rotational media, number of power cycles, amount of time the hard disk drive is powered on, and/or other parameters.

Telemetry module 310 may include phases such as a) a calibration and configuration phase and b) a steady state phase also referred to as a steady phase. During the calibration and configuration phase, a determination on which subsystems to track or learn and how to do the tracking is performed. In addition, a user may choose an application and/or process to be included in the data collection and learning from the collected data in addition to default applications and/or processes. The user may also identify data associated with the user context and the system context for collection. Data associated with user context would include calendar data, timestamps, and applications/processes data. Data associated with the system context may include location data, user behavior data, system settings, data associated attached peripherals, battery life and its runtime operation, and other environmental information. User behavior may include various inputs such as text, voice, gesture, facial, and gaze tracking information.

During the steady state phase, data may be collected periodically which may occur at various intervals or triggered by an event or action as depicted in flow 350. For example, the data may be collected or transmitted daily, hourly, etc. The event and/or action that triggered the data collection or transmission may be associated with a user context or system context. User context-based events and/or actions may include the opening or closing of an application. For example, the telemetry plugin may start data collection when a user closes or shuts down certain applications when switching from a first user context to a second user context. By collecting data at this point, the system may learn that applications associated with a user context can be closed before the next occurrence of the second user context.

System based events and/or actions may include projection to an external display, adjusting the hinge or posture of the external display, etc. For example, the telemetry plugin may start data collection when the user powers on an external projector. Data collection associated with the system context may be performed via various mechanisms such as using a software development kit (SDK), and operating service, etc. Because the data collection may be event-based instead of constantly performing the data collection, the software service saves resource consumption. In another embodiment, instead of telemetry module 310 collecting data from one or more components of the information handling system, the components may transmit the data to telemetry module 310 periodically or upon triggered by the aforementioned event or action.

Telemetry module 310 transmits collected data to data repository 315 based on its context as depicted in flow 355. Telemetry module 310 may be configured to pre-process data input 305 before the transmission. Data repository 315 may be a data lake or data warehouse configured to store the contextual input received from telemetry module 310. Data input 305 may be structured, semi-structured, or unstructured. In another embodiment, telemetry module 310 may transmit data input 305 to training module 320 in addition or in lieu of transmitting data input 305 to data repository 315.

At flow 360, data input 305 may be transmitted to training module 320 for learning. The learning from the collected data may be based on a user context and/or a system context. In another embodiment, training module 320 may query data repository 315 for data input 305. As depicted, flow 350, flow 355, and flow 360 may be included in loop 345, which may be performed periodically or when triggered by an event and/or action. After training a model on the data received, training module 320 may transmit the trained model to optimization service 325 in flow 365. Optimization service 325 may be configured to gain inference through the data trained at training module 320 and generate a recommendation to be transmitted to recommendation service 330 in flow 370.

Recommendation service 330, which is an operating system service, may be configured to wait for the recommendation from optimization service 325 as depicted in flow 375. Upon receipt of the recommendation, recommendation service 330 may be configured to determine the responsiveness time budget for the user or system context based on the responsiveness scores and/or memory utilization associated with each knob at flow 380. The responsiveness time budget may include a response time constraint for the application and/or configuration setting. In addition, at flow 385, recommendation service 330 may determine and output an ordered list of applications based on the user context and/or system context associated with the recommendation as constrained by the responsiveness time budget.

Based on the recommendation, recommendation service 330 may use various mechanisms to preload applications to a RAMDisk, cache, etc. as well as to flush the cache at flow 392 and flow 390 respectively. Recommendation service 330 may be configured to offload tasks and reduce resistance for the user in initiating and completing certain tasks based on the recommendation at flow 395. Recommendation service 330 may manipulate system settings via system management service 340, which may be similar to DPTF, to optimize the responsiveness of the information handling system according to user context or system context.

Figure 4:
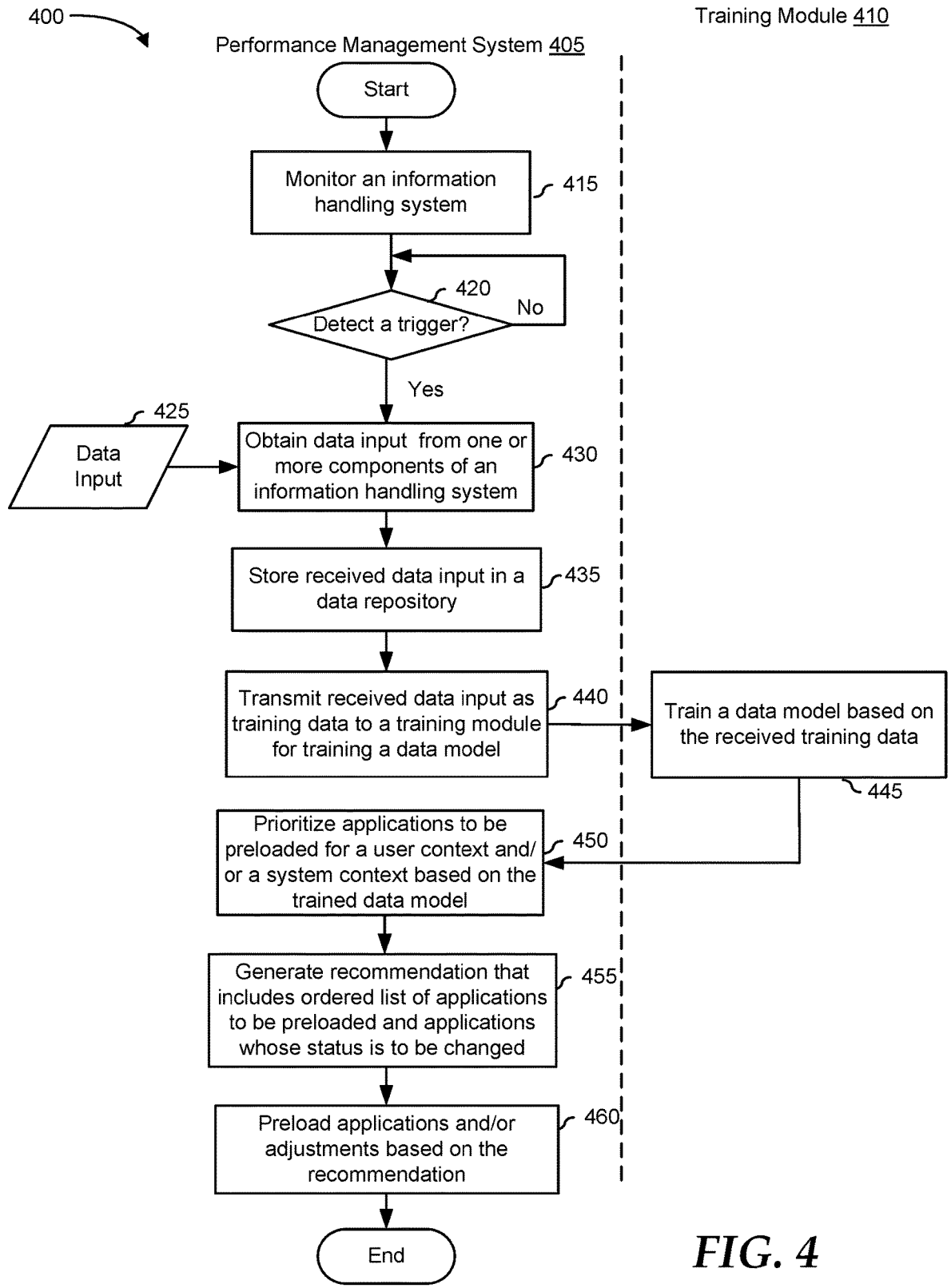
FIG. 4 is a flowchart illustrating an example of a method for context-based performance optimization of an information handling system, according to an embodiment of the present disclosure.

FIG. 4 illustrates a method 400 for context-based performance optimization of an information handling system. Method 400 may be performed by one or more components of FIG. 2. In particular, various blocks of method 400 may be performed by a performance management system 405 which is similar to performance management system 210 of FIG. 2. While block 445 may be performed by a training module 410 which is similar to training module 260 of FIG. 2. Although embodiments of the present disclosure are described in terms of system 200 of FIG. 2, it should be recognized that other systems may be utilized to perform the described method.

The performance management system may include a software service and an operating system service. The software service may be configured to learn, adapt, and preload applications based on user and system contexts. In addition, the software service may be configured to manipulate system settings to maximize the responsiveness according to the user's perception without trading off the performance in instances wherein the responsiveness time budget is constrained. The software service and/or the operating system service may be configured to generate recommendations in real-time based on the data collected by the software service as input. The software service may also be configured to generate and load configuration parameters like a responsiveness budget per application context to be used during the preloading of the applications. Assume this is P (i) where P is the configuration parameters and i is the number of application contexts. In addition, the operating system service may be configured to handle and apply the recommendations such as to preload applications and/or perform system manipulations such as to power on system devices such as an external display via various mechanisms such as DPTF or a power management system.

Method 400 dynamically prioritizes applications and system settings, based on user and/or system context increasing the overall responsiveness of the information handling system across a set of applications for a given activity based on the user's perspective. Specific applications may have a maximum threshold for responsiveness. On this basis, method 400 may determine to preload these applications. On the other hand, other applications may be shut down to free up resources for a given user activity.

Method 400 typically begins at block 415 where the monitors the information handling system for a trigger, which may be an event such as an upcoming user activity or a time-based event. The method proceeds to decision block 420, where the method determines whether it detects a trigger. If the method detects a trigger, then the "YES" branch is taken, and the method proceeds to block 430. If the method does not detect a trigger, then the "NO" branch is taken, and the method loops back to decision block 420.

At block 430, the method may obtain data input 425 by collecting or receiving data input 425 from one or more components of an information handling system. The method may collect or receive the data in real-time or in periodically mode. The method may collect current data or deltas from a previous trigger. The method proceeds to block 435 where the method ingests or stores the received data input in a data repository. The method proceeds to block 440 where the method transmits the received data input 425 to training module 410 where various machine learning mechanisms may be employed to learn from the training data at block 445.

The method may proceed to block 450 where training module 410 transmits the trained data model to performance management system 405 where the method prioritizes applications for preloading and/or status to be changed based on the trained data model. The priorities may also be based on the information associated with the user context and/or the system context. The user context may include one or more application contexts. Configuration settings within each application context may also be prioritized based on responsiveness and/or memory utilization.

The method may proceed to block 430 where the method generates a recommendation based on the prioritizations. The recommendation an ordered list of applications to be preloaded and/or applications whose status is to be updated. The ordered list of applications may be determined based on a responsiveness time budget optimizing the performance of the information handling system as perceived by the user. The method may then proceed to block 460 where the method may generate rules to apply the recommendations. The method may clear the cache, preload the applications, close other applications, adjust configuration settings of running applications, and/or perform other mechanisms to optimize the performance of the information handling system such as adjusting system settings based on the recommendation generated at block 455. Afterward, the method ends.

Although FIG. 4 shows example blocks of method 400 in some implementation, method 400 may include additional blocks, fewer blocks, different blocks, or differently arranged blocks than those depicted in FIG. 4. Additionally, or alternatively, two or more of the blocks of method 400 may be performed in parallel. For example, block 435 and block 440 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   obtaining, by a processor, telemetry data from one or more components of an information handling system, wherein the telemetry data includes contextual inputs regarding a user context;
   determining a first priority of each one of a first plurality of applications to be preloaded based on the contextual inputs;
   determining a second priority of each one of a second plurality of applications which status is to be changed based on the contextual inputs;
   determining a recommendation that includes a first ordered list of the first applications according to the first priority, a second ordered list of the second applications according to the second priority, and the system setting to be adjusted, wherein the first priority and the second priority are constrained by a responsiveness time budget;
   preloading one of the first applications according to the first ordered list within the responsiveness time budget;
   changing the status of one of the second applications according to the second ordered list; and
   adjusting a system setting of the information handling system according to the recommendation.

2. The method of claim 1, wherein the obtaining of the telemetry data is performed periodically.

3. The method of claim 1, wherein the obtaining of the telemetry data is triggered by an event.

4. The method of claim 3, wherein the event is a transition from a user activity to another user activity.

5. The method of claim 1, wherein the changing the status of the one of the second plurality of applications includes closing the one of the second plurality of applications.

6. The method of claim 1, wherein the recommendation includes a configuration knob to adjust a configuration setting associated with the each one of the first plurality of applications.

7. The method of claim 6, wherein the recommendation includes a responsiveness score associated with a configuration knob.

8. The method of claim 6, wherein the recommendation includes a memory utilization information associated with the configuration knob.

9. The method of claim 1, wherein the recommendation includes a flag indicating whether to close the one of the second plurality of applications.

10. The method of claim 1, further comprising clearing a cache prior to the preloading of the one of the first plurality of applications.

11. The method of claim 1, wherein the changing the status of the one of the second plurality of applications includes putting the one application in background.

12. The method of claim 1, wherein the recommendation further includes the system setting to be adjusted.

13. An information handling system, comprising:
    a data repository configured to store contextual inputs obtained from a plurality of components associated with the information handling system; and a processor configured to:
: obtain telemetry data from one or more of the components, wherein the telemetry data includes contextual inputs according to a user context and a system context;
: determine a recommendation that includes a first plurality of applications to be preloaded, and a second plurality of applications which status is to be changed based on the contextual inputs according to the user context,
: wherein the recommendation further includes one or more system settings to be adjusted based on the contextual inputs according to the system context;
: determine a first ordered list of the first applications to be preloaded according to a first priority and a second ordered list of the second applications which status is to be changed according to a second priority based on the recommendation;
: preload the first applications based on the first ordered list according to the first priority, wherein the preload of the applications is performed within a responsiveness time budget;
: change the status of one the second applications based on the second ordered list according to the second priority; and
: adjust the one or more system settings on the information handling system based on the recommendation.

14. The information handling system of claim 13, wherein the recommendation includes a configuration knob that is associated with a configuration setting of the one of the first plurality of applications.

15. The information handling system of claim 13, wherein the change of the status of the one of the second plurality of applications includes the processor further configured to put the one of the second plurality of applications in foreground.

16. The information handling system of claim 13, wherein the recommendation further includes the one or more system settings to be adjusted.

17. A non-transitory computer-readable medium including code for performing a method, the method comprising:
: obtaining telemetry data from one or more components of an information handling system, wherein the telemetry data includes contextual inputs according to a user context and a system context;
: determining a system setting to be adjusted based on the system context;
: determining a recommendation that includes a first plurality of applications to be preloaded, and a second plurality of applications which status is to be changed, and the system setting to be adjusted, wherein the recommendation is based on the contextual inputs;
: determining a first ordered list of the first plurality of applications and a second ordered list of the second plurality of applications;
: preloading the first applications based on the first ordered list;
: changing the status of the second applications based on the second ordered list; and
: adjusting the system settings setting on the information handling system based on the recommendation.

18. The non-transitory computer-readable medium of claim 17, further comprising monitoring the information handling system to detect an event.

19. The non-transitory computer-readable medium of claim 18, wherein the obtaining the telemetry data is trigged by the event.

20. The non-transitory computer-readable medium of claim 17, further comprising receiving a trained model that was trained based on the telemetry data.

\* \* \* \* \*